June 10, 1952 N. MOSCA 2,599,931
LATHE JIG FOR TURNING CRANKSHAFTS
Filed May 28, 1947 2 SHEETS—SHEET 2
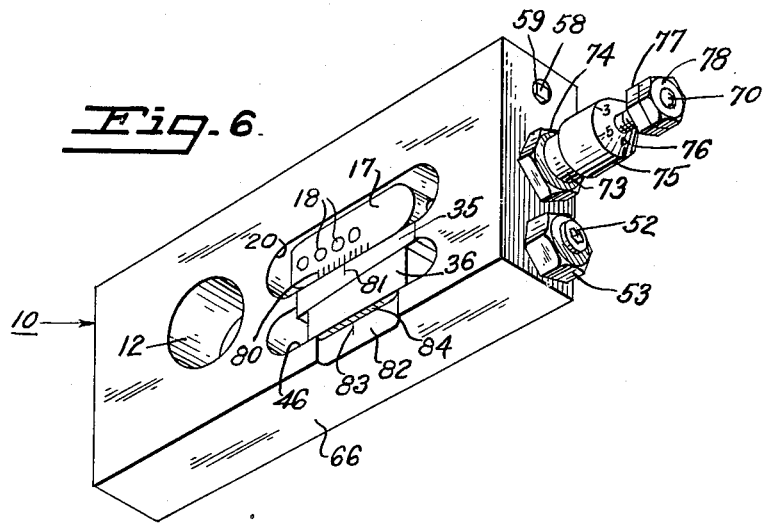
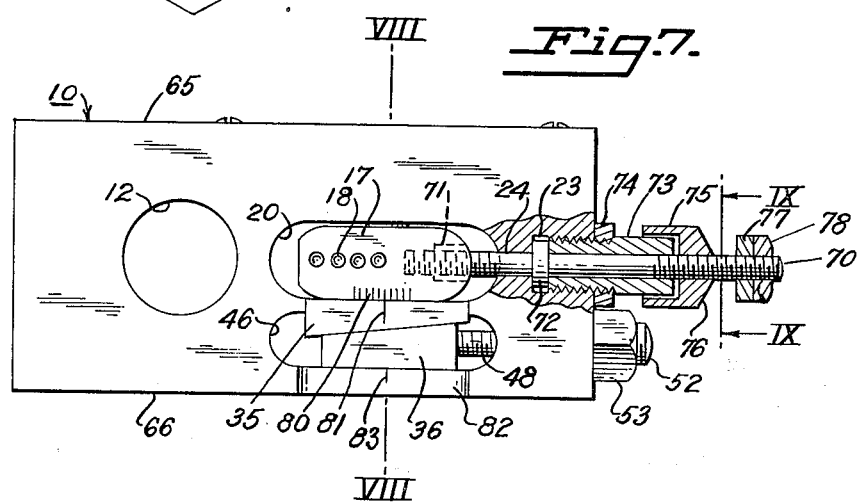
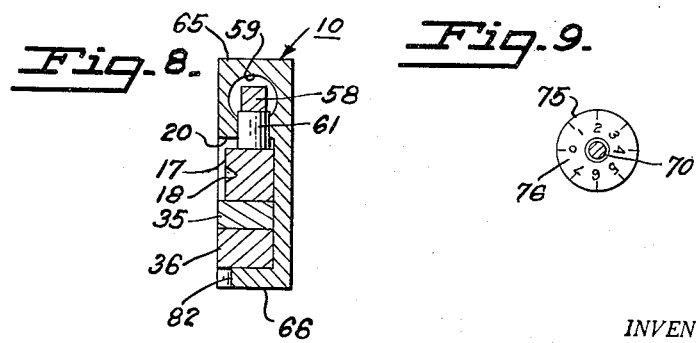
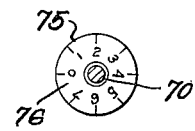
INVENTOR.
NESTOR MOSCA
BY
ATTORNEY Patented June 10, 1952

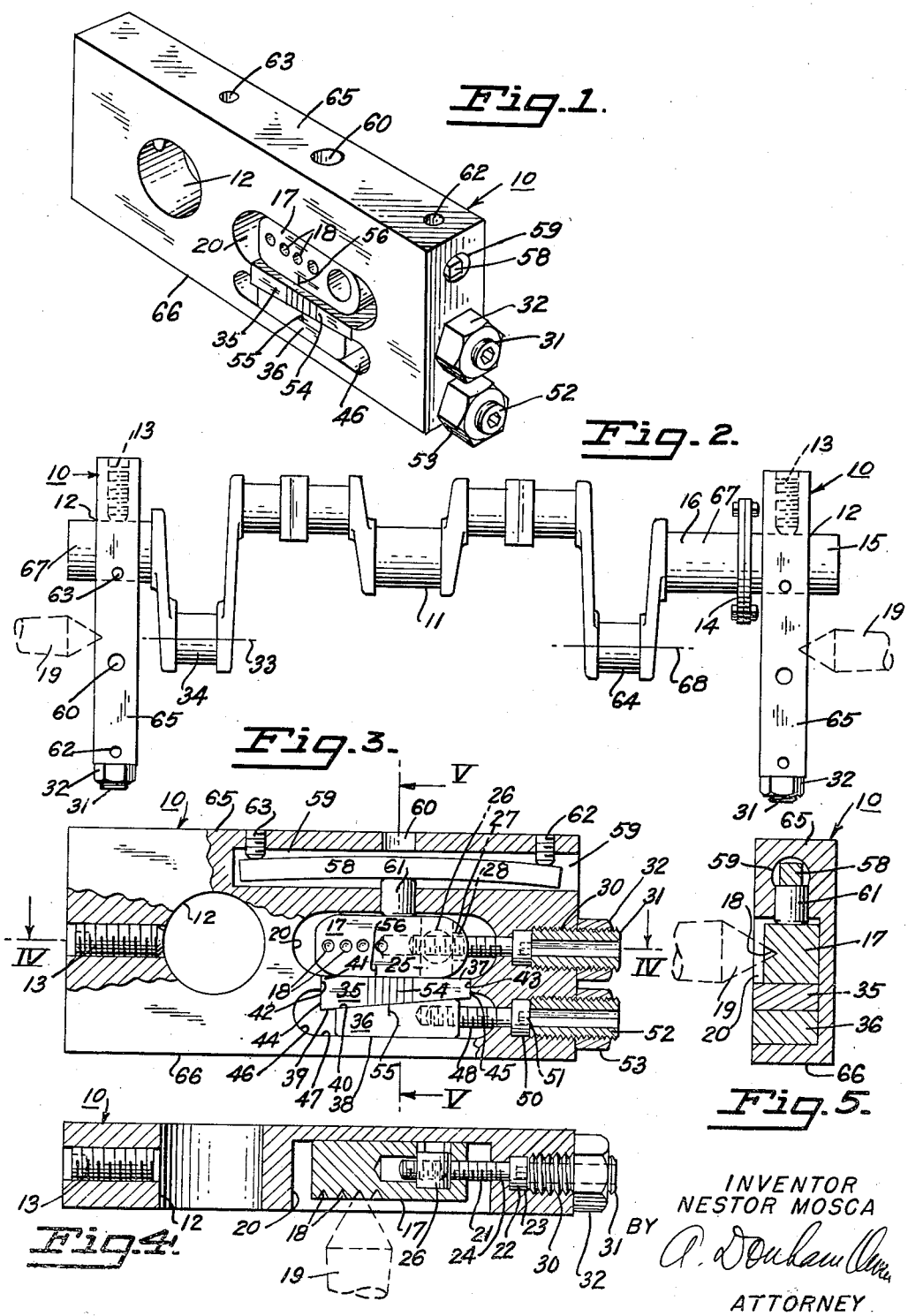

2,599,931

UNITED STATES PATENT OFFICE 2,599,931

LATHE JIG FOR TURNING CRANKSHAFTS

Nestor Mosca, Oakland, Calif.

Application May 28, 1947, Serial No. 751,039

5 Claims. (Cl. 82—9)

This invention relates to an improved jig for turning axially aligned bearing surfaces on the throws of a crankshaft.

One object of this invention is to provide a jig for lathes which can be used in identical pairs, for accurate truing of the crank-pin-bearing surfaces of a crankshaft.

Another object of this invention is to provide a jig which is adjustable in two mutually perpendicular directions so that a true center can be obtained for each crank pin on the crankshaft.

Another object of this invention is to provide a calibrated jig so that the jig on one end of the crankshaft can be adjusted to correspond exactly with a previously adjusted jig on the other end.

Another object of this invention is to provide a jig which will solve the problem of truing the bearing surfaces on the crank throws of a shaft where usage has caused the crank pins on the same side of a crankshaft to be twisted out of axial alignment with each other. The present device makes it easy to align each bearing surface axially in normal relation to the piston and connecting rod travel above it, and independently of what position other crank pins on the same side may require to align them axially in normal relation to their respective piston and connecting rod travel.

Other objects and advantages of this invention will appear from the course of the following description of an embodiment of this invention. This description is given in accordance with R. S. 4888 and is not intended to limit the scope of the claims to the specific illustrative embodiment.

In the drawings:

Fig. 1 is a view in perspective of a jig embodying this invention;

Fig. 2 is a view in elevation showing a crankshaft set in two identical jigs of the type shown in Fig. 1;

Fig. 3 is a plan view, partly in section, of the device in Fig. 1;

Fig. 4 is a view in section along the line IV—IV in Fig. 3; and

Fig. 5 is a view in section along the line V—V of Fig. 3.

Fig. 6 is a view in perspective, looking from below, of a modified form of device embodying my invention;

Fig. 7 is a plan view, partly in section, of the device of Fig. 6;

Fig. 8 is a view in section along the line VIII—VIII in Fig. 7; and

Fig. 9 is a view looking down on the calibrated collar employed in the device shown in Figs. 6 to 8, along the line IX—IX in Fig. 7.

Broadly speaking, the jig 10 has a bore for holding one end of the crankshaft rigidly, a face block with sockets adapted to receive the center pin of a lathe, means to move the face block in each of two mutually perpendicular directions, and means for securing the face block in the positions to which it is moved. Calibrations are provided so that an identical jig may be secured to each end of the crankshaft and then set to correspond with each other.

As shown in Fig. 2 a crankshaft 11 can be held rigidly in the bearing openings 12 of each jig 10 by a set screw 13. (Preferably a piece of lead or some similar material should be placed between the set screw 13 and the crankshaft 11 to prevent any scoring of the shaft 11 by the screw 13.) Most crankshafts today have a face plate 14 at one end to which the flywheel and clutch assembly is bolted. A face plate 14 and stub shaft 15 is used on the right-hand end 16 of the crankshaft 11 to provide a bearing to fit the bore 12 in the right-hand jig. If the jig 10 is constructed as illustrated from a rectangular block of metal and if the two jigs are identical, alignment of the shaft 11 is a very simple matter.

The face block 17 has several tapered sockets 18 adapted to receive the point of a lathe center 19. The block 17 fits within the opening 20 in the face of the jig 10—the opening 20 being somewhat wider and longer than the face block 17 for reasons which will appear presently. The block 17 is moved lengthwise in the opening 20 by means of a threaded member 21 having a head 22 which fits in a recess 23 in alignment with a hole 24 in the end of the opening 20. The block 17 has a transverse slot 25 with a special threaded slide 26 closely fitted in the slot 25. The opening 27 in the end of the block 17 has clearance on both sides at 28 to permit lateral shifting of the block 17 in relation to the control member 21 which is threaded into the slide piece 26. The head 22 of the member 21 is recessed to receive an Allen wrench. The block 10 is bored out above the head and threaded at 30 to receive a hollow Allen set screw 31 which functions to hold the head 22 of the screw 21 snug in the recess 23. A nut 32 locks the set screw 31 in place. A very delicate adjustment is needed in this kind of work and by means of the above mechanism the face block 17 can be moved linearly inside the opening 20 in the face of the jig 10.

Accurate linear adjustment alone is not sufficient for a jig for truing a crankshaft. There must also be provision for movement of the face block 17 in a direction perpendicular to its linear adjustment just described, so that the axial center line 33 of the crank pin 34 may be brought into alignment with the axis of the lathe centers 19. To provide for this second adjustment, my invention contemplates the use of a pair of adjacent, sliding, calibrated blocks 35 and 36 having their opposite faces 37 and 38 parallel and having their contacting faces 39 and 40 set at an angle longitudinally so that relative longitudinal movement of the blocks 35 and 36 will increase or diminish the distance between the parallel faces 37 and 38. These blocks 35 and 36 are mounted in the jig 10 in openings adjacent the opening 20 containing the face block 17. The calibrated block 35 is carefully fitted into an opening 41 having parallel ends 42 and 43 which engage the parallel ends 44 and 45 of the block 35. This permits the block 35 to move toward and away from the block 17 but not longitudinally to any noticeable extent. The other block 36 is fitted into an opening 46 having a wall 47 substantially parallel with the face 37 on the block 35. The face 38 of the block 36 bears on this parallel face 47 and there is sufficient end clearance in the opening 46 for the block 36 to be moved longitudinally in relation to the block 35 by the screw 48 which is threaded into the block 36. The screw 48 is mounted in a recess 50 in the jig 10 and has an Allen head 51. An Allen set screw 52 and a lock nut 53 hold the screw 48 snug against longitudinal play in the recess 50. As the screw 48 is turned the block 36 moves relatively to the block 35 and the face 37 on the block 35 being in contact with the block 17 moves the latter sideways in the opening 20. The calibrations 54 on the block 35 and the single mark 55 on the block 36 indicate a particular setting which may be used in setting the blocks on the jig at the other end of the crankshaft. It matters not whether the more calibrations 54 are on one or the other of the blocks 35 and 36.

Also on the block 35 and the block 17 are a set of related calibrations 56 so that the same distance from the shaft center to the lathe center can be read and the jig on the other end given a similar or related setting.

Any suitable means may be used for holding the block 17 snug against the block 35 and the block 35 against the block 36. In Figs. 3 and 5 this is accomplished by a strong bar spring 58 which is inserted into a longitudinal recess 59 in the jig 10 after the insertion into the opening 60 of a hard metal bearing member 61. The length of this bearing member 61 should be sufficient to keep the block 17 under substantial pressure for all positions of the moving block 36. Screws 62 and 63 are used to depress the ends of the spring 58 to bring considerable force against the bearing 61 and therefore against the top of the face block 17 so that it is held rigidly in all of its lateral positions and will move laterally only when the wedge block 36 is moved linearly.

In operation, the crankshaft 11 has a jig 10 secured to each end as shown in Fig. 2. The operation planned there is to turn a new surface on the crank pin 34 or 64 or both.

In order to make the calibrations 54 and 56 applicable with reasonable accuracy, the jigs 10 are made with great care, and the sides 65 and 66 of each are parallel and the blocks 17, 36, and 37 in each are spaced in the same distance from the edges. Thus the first step for each setting of the jigs 10 on the crankshaft 11 is to lay the jigs 10 on their sides on a known flat surface. When in this position the set screws 13 are tightened on the main bearings 67 of the crankshaft 11.

If we start with the jigs 10 on each end of the crankshaft 11 as shown in Fig. 2 and assume first that the crank pin bearings 34 and 64 are in perfect alignment, the next step is to mount the jigs 10 between the lathe centers 19, selecting a recess 18 in the block 17 which comes closest to aligning the lathe centers 19 with the axial center of the bearings 34 and 64. To get perfect alignment an Allen wrench is inserted into the screw head 22 of the screw 21 and the block 17 on each jig is moved in or out as required to get the correct radial position which should be the same reading on the calibrated scale 56 on each jig. Next the Allen wrench is inserted into the screw 48 and the block 36 in each jig is moved in or out to cause a lateral shifting of the block 17 to bring the lathe center 19 into exact alignment with the axial center 33 of the crank pin bearings 34 and 64. Here again the scale 54 on the blocks 35 and 36 should read alike. These bearings 34 and 64 are then resurfaced. Next the set screws 13 are loosened and the jigs are laid on a flat surface, and the crankshaft is rotated a partial turn to bring the block 17 with its recesses 18 into substantial alignment with another pair of crank pins and the above procedure is repeated. Sometimes after use, the crank arms projecting from the same side of a crankshaft will not be in the same radial plane due to strain, warping or other causes. In such a case the two bearing surfaces 34 and 64 will not necessarily be in axial alignment, and in resurfacing them it is preferable to do each one separately. Each crank pin bearing 34 and 64 should have its axis 33 and 68, respectively, in perfect alignment with the main bearings 67 of the crankshaft 11. When this is true the axis of the crank pin bearing will be normal to the path of the connecting rod. Thus in cases where any pair or more of crank pins are not perfectly aligned, as is sometimes found, the setting is made correct for one crank pin bearing at a time, and that bearing is resurfaced at that setting. Usually the other crank pin bearing will have the same radial adjustment and only a small lateral adjustment on each block 35 in each jig will be needed to position it for resurfacing.

The same principles and the same general method of use apply to the modified form of device illustrated in Figs. 6 to 9. The general form of the jig 10 is the same, and the face block 17, on which are the sockets 18, is mounted for movement longitudinally or laterally in the opening 20. The longitudinal movement is controlled by a different form of threaded member 70, which is threaded into the block 17; a recess 71 in the face block 17 gives the threaded rod 70 play when the face block 17 is moved laterally by the wedge 35.

The threaded member 70 extends out through the hole 24 in the jig 10 near the opening 20, and bears an integral collar 72 which fits in the base of the recess 23. A collar nut 73 is threaded into the recess 23 over the rod 70 to hold the colar 72 snugly against the end of the recess 23 and is itself locked in place by a lock nut 74.

The collar 75 which has a calibrated top face 76 is threaded on the rod 70 over the collar nut 73, and is held in place by a set screw. These calibrations can be read against the adjacent edges of the block 10 to enable the operator to know at a glance the position of the block 17 as he adjusts it. Two hexagonal nuts 77 and 78 are subsequently threaded on the rod 70 adjacent the end of the rod 70 and when tightened together serve to lock each other and provide the means by which a wrench can be used to adjust the longitudinal position of the face block 17.

The calibrations 80 on the block 17 are read against the single mark 81 on the wedge block 35, which is in other respects like the block 35 illustrated in Fig. 1. The wedge-shaped block 36 may be constructed in the manner already described in connection with the Fig. 1 type of embodiment, or it may be moved back and forth by a threaded member like the member 70, just described for the block 17.

In the modified form of the invention, the portion 82 of the jig 10 between the edge of the jig and the recess 46 is milled down as illustrated in Fig. 6, and a single calibration mark 83 is placed on it. This is read against the calibrations 84 on the vertical edges of the block 36 to give the longitudinal position of the block 36 and thereby the lateral position of the block 17. The advantage of this modified manner of calibration is that it is better suited to be observed from the side and thus enables the operator to observe the calibrations as he adjusts the device without getting into an unnatural position to do so.

I claim:

1. A lathe jig for supporting an end of a crankshaft in a lathe while resurfacing its crank pin bearing surfaces, including a main body member, two of whose sides lie in planes parallel to each other, said body member also having a hole therein to receive the main bearing of a crankshaft and means for securing said bearing against rotation in said hole, said body member also having an opening one side of which is a guide face parallel to said sides of said body member; a lathe-center-receiving block positioned in said opening; means for holding said block in any selected longitudinal position in said opening, said means including a screw member mounted in one end of said opening and slidably connected to said block; means for holding said block in any selected lateral position in said opening, said latter means including a pair of complementary wedge-shaped pieces positioned so that one bears on one side of said block and the other bears on said guide face and the wedge surfaces bear on each other; means on said body member for limiting one of said pieces to lateral motion; means for moving the other piece along said guide face; and adjustable means on the other side of said block for holding it securely in whatever position it is moved by said wedge means.

2. A lathe jig for supporting an end of a crankshaft in a lathe while resurfacing its crank-pin-bearing surfaces comprising a main body member having a hole therein adapted to fit over a main bearing of said crankshaft and means for rigidly mounting said body member in selected positions on said bearing; said body member also having an opening therein, a block mounted in said opening and having a lathe center recess, said block being smaller than said opening; means for holding said block in any desired lengthwise position in said body member, and means for holding said block in any desired sidewise position in said body member, said latter means including a wedge-shaped piece in contact with said block and movable lengthwise in said body member to move said block in one direction and a pressure means to apply a holding pressure on said block from the opposite direction.

3. A lathe jig for supporting an end of a crankshaft in a lathe while resurfacing its crank-pin-bearing surfaces comprising a main body member having a hole therein adapted to fit over a main bearing of said crankshaft and means for rigidly mounting said body member in selected positions on said bearing; said body member also having an opening therein, a block mounted in said opening and having a lathe center recess, said block being smaller than said opening; means for holding said block in any desired lengthwise position in said body member, and means for holding said block in any desired sidewise position in said body member, said latter means including a pair of complementary wedge-shaped pieces located to one side of said block in the opening in said body member, one piece being in contact with said block and being substantially immobile lengthwise in said opening but mobile crosswise therein, and the other wedge piece being movable lengthwise in said opening; and means for holding said last-named wedge piece at any desired position in its range of travel.

4. A lathe jig for supporting an end of a crankshaft in a lathe while resurfacing its crank-pin-bearing surfaces comprising a main body member having a hole therein adapted to fit over a main bearing of said crankshaft and means for rigidly mounting said body member in selected positions on said bearing; said body member also having an opening therein, a block mounted in said opening and having a lathe center recess, said block being smaller than said opening; means for holding said block in any desired lengthwise position in said body member, and means for holding said block in any desired sidewise position in said body member, said latter means including a pair of complementary wedge-shaped pieces located to one side of said block in the opening in said body member, one piece being in contact with said block and being substantially immobile lengthwise in said opening but mobile crosswise therein, and the other wedge piece being movable lengthwise in said opening, indicia on said block, and on said wedge pieces to show the relative positioning of said block to the wedge piece adjacent it and of said wedge pieces relative to each other; and means for holding said last-named wedge piece at any desired position in its range of travel.

5. A crankshaft jig for lathes having means to hold one end of a crankshaft rigidly, a face block having a socket adapted to receive the lathe center of a lathe, and means to move said face block linearly, having in combination therewith a spring to resist movement of said face block in a direction normal to said linear movement, a calibrated block having a plane parallel edge facing said face block and an inclined edge facing in the opposite direction, and a wedge with an index mark movable against said calibrated block to move said face block in a direction normal to said linear movement against the pressure of said spring.

NESTOR MOSCA.

REFERENCES CITED

The following references are of record in the file of this patent:

UNITED STATES PATENTS

| Number | Name | Date |
|---|---|---|
| 916,646 | Anderson | Mar. 30, 1909 |
| 1,451,078 | Mantha | Apr. 10, 1923 |
| 2,111,096 | Fritzsch | Mar. 15, 1938 |
| 2,357,062 | Stoll | Aug. 29, 1944 |

FOREIGN PATENTS

| Number | Country | Date |
|---|---|---|
| 18,776 | Great Britain | of 1898 |
| 72,906 | Germany | Jan. 12, 1894 |
| 815,016 | France | July 5, 1937 |